Patented May 9, 1950

2,507,468

UNITED STATES PATENT OFFICE 2,507,468

MONOBASIC PHOSPHATE OF 1-PHENYL-2-AMINOPROPANE

Theodore C. Goggin, Pitman, N. J., assignor to Clark & Clark Co., Wenonah, N. J., a corporation of Delaware No Drawing. Application February 13, 1948, Serial No. 8,275

3 Claims. (Cl. 167—65)

My invention relates to a new chemical compound that is especially suited for therapeutic use. More particularly it concerns the monobasic phosphate of 1-phenyl-2-aminopropane, a method of preparing it, and therapeutic compositions containing this salt.

It is known that 1-phenyl-2-aminopropane (commonly referred to as "amphetamine") and certain of its salts have a pronounced therapeutic effect, particularly as stimulants for the central nervous system. This is evidenced by a feeling of well-being and energy, as well as by a reduction of appetite and desire to sleep. The foregoing effects render these compounds of substantial value in the treatment of various pathologic conditions, such as despondency, fatigue, alcoholism, narcolepsy, obesity and the like. Unfortunately, the beneficial effects of these known compounds are accompanied by certain deleterious effects, particularly an undesirable stimulation of the sympathetic nervous system, frequently resulting in uncontrollable jitteriness. Often a cumulative effect of repeated dosages is evidenced by a disagreeable "hang-over." Furthermore, the known compounds leave much to be desired in one or more respects, such as solubility, stability, metabolism, etc.

It is an object of my invention to provide a novel salt of 1-phenyl-2-aminopropane which possesses the above-mentioned beneficial effects to an unusual extent, and which at the same time possesses the deleterious effects referred to previously to a lesser extent than was heretofore deemed possible. A further object is to provide such a salt having improved physical properties, compared to the known salts, and which is subject to more economical utilization by the body. Another object is to prepare the new salt in a simple, expeditious manner, whereby a high degree of purity, excellent physical form and great stability are assured. A still further object is to make available various therapeutic compositions particularly adapted for the treatment of obesity and of dysmenorrhea, in which my novel salt is combined with other therapeutically active constituents for maximum desired effect. Additional objects will become apparent from a consideration of the following description and claims.

The foregoing objects are accomplished in accordance with my invention which is particularly concerned with the monobasic phosphate salt of 1-phenyl-2-aminopropane. This novel compound will hereinafter sometimes be referred to as "monobasicamphetamine phosphate" or "amphetamine dihydrogen phosphate." Said salt is formed by the combination of equimolecular amounts of the amphetamine base and phosphoric acid. It is distinguished from the dibasic (monohydrogen) and tribasic (fully neutralized) forms, since these contain two and three mols, respectively, of amphetamine for each mol of phosphoric acid. My new salt may be represented by the following structural formula:

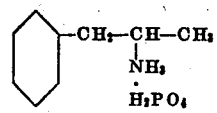

The novel amphetamine dihydrogen phosphate may exist in the dextro- or levo- rotary forms or as a racemic mixture thereof, depending upon the form of the base from which it is derived. In practice, I prefer to employ the racemic form and the specific data hereinafter given concerning the physical characteristics of the salt apply to this form of the salt.

My monobasic amphetamine phosphate is a white, impalpable powder that is freely soluble in water and sparingly soluble or insoluble in most organic solvents. It is not demonstrably hygroscopic and is completely stable under ordinary conditions of storage. It begins to sinter at 145° C., becomes a clear amorphous mass without liquifaction at 147° C., and retains the latter form up to about 285° C. at which point it begins to decompose with the evolution of a gas (probably $CO_2$). Its melting point could therefore not be determined.

My new salt may be prepared by adding to amphetamine an equimolecular amount of phosphoric acid. The amount of phosphoric acid required may either be calculated beforehand or else controlled by observing the pH of the reaction mixture and discontinuing the addition as soon as the desired pH value is reached. The pH of a 10% solution of my new salt at a temperature of 25° C. is 4.95 to 5.00 determined colorimetrically and electrometrically. The neutralization reaction is strongly exothermic and, unless modified and controlled in a manner such as will be hereinafter described, results only in a chemical mass consisting of varying proportions of the three possible phosphates with, under certain circumstances, an excess of base or of acid intermingled.

I have found that the necessary control of the reaction may be achieved by having present a substantial amount of a solvent for the amphetamine. One may employ a solution of the amphetamine in water or in an organic solvent such as carbontetrachloride, ethyleneglycol, propylalcohol, chloroform, acetone and the like. The organic solvents, particularly acetone, are preferred. The phosphoric acid is slowly added to such an amphetamine solution under constant agitation. After the precise amount required to form the monobasic salt has been added, agitation is continued for up to a half hour or more to insure complete conversion of the base to the desired salt. When an organic solvent such as acetone is employed, the salt separates in the form of a fine, white, flocculent precipitate that becomes more and more dense and abundant as the reaction proceeds. The precipitate may be separated by filtration and, when dried, is in a very suitable form for compounding in various therapeutic preparations.

The following example will serve to illustrate the preparation of my new salt. The invention is, of course, not limited to the details given therein.

*Example*

135 grams (1 mol) of amphetamine (1-phenyl-2-aminopropane) were stirred into 300 cc. of acetone in a stainless-steel vessel. To the resultant solution there were slowly added under constant agitation 115.3 grams of 85% phosphoric acid (containing 1 mol of $H_3PO_4$), care being taken to avoid any sudden rise in temperature or local overheating due to the considerable amount of heat that is evolved. During the addition of the phosphoric acid a fine, white, flocculent precipitate appears which becomes more and more dense and abundant, as the quantity of added acid increases.

When the entire quantity of the phosphoric acid has thus been added, agitation of the mixture is continued for about a half hour or more to insure complete conversion. The precipitate is then allowed to settle, the supernatant liquid is drawn off, and the residue is filtered. The precipitate thus separated may, if desired, be washed with acetone and is then dried by evaporation to constant weight. It forms a fine, white, impalpable powder consisting of pure monobasic amphetamine phosphate. When employing the racemic amphetamine, a racemic salt is formed having the physical characteristics hereinbefore described.

My new salt, obtained as described above, may, if desired, be ground to such a fineness that it will pass through a 100 mesh sieve. It is then ready for compounding into various forms and preparations for therapeutic use. For example, it may be incorporated in the customary extenders or excipients, such as milk sugar, and made into tablets, each containing a predetermined dosage of the salt, such as 5 or 10 mgm. Another convenient and desirable form for oral administration is obtained by incorporating my new salt in the coating of a standard form of chicle chewing gum. In such case the entire dosage of the salt is preferably incorporated in an intermediate layer of the coating, so that it will be quickly available and yet protected by an outer layer.

An important advantage of my new salt lies in its ready solubility in water. It is about six times as soluble as either the dibasic phosphate or the dibasic sulfate. Thus a quicker and more intense therapeutic action is assured. The action is also less persistent from the standpoint of cumulation that may result in a "hang-over" feeling.

Based upon extensive experience in human therapy, I have determined that the monobasic amphetamine phosphate is more effective, dose for dose, than is the dibasic amphetamine sulfate, which is the best known of the amphetamine salts. This is indeed surprising, because my new salt contains less of the amphetamine base than does an equal quantity of the dibasic sulfate. It follows that the amphetamine is far more potent in the form of the monobasic phosphate, than in the form of the salt most widely used today.

While my salt is more effective, dose for dose, than the dibasic sulfate, insofar as the desired stimulation of the central nervous system is concerned, it produces less undesirable side-effects attributable to stimulation of the sympathetic nervous system. This may be due to the fact that it contains less of the amphetamine base. However, that does not explain why the desired therapeutic effects are not similarly diminished, but rather substantially enhanced. It appears that the undesirable side-effects are distinct from the desired effects of these salts, insofar as dosage is concerned, and it is probable that the desired effects are favorably influenced by the presence of phosphoric acid. It is well known that phosphates in general are metabolized more readily than are the sulfates which are foreign to the physiologic processes of the body. Regardless of what may be the true explanation, the fact remains that the desired effects can be produced with my new salt, while greatly diminishing or completely eliminating the undesired effects that were heretofore considered inevitable in the therapeutic use of amphetamine salts.

My salt is particularly suited for incorporation with other therapeutically active substances to form preparations that are highly effective in the treatment of obesity and for the relief of dysmenorrhea and of other types of non-organic pain. It is compatable with a great variety of such other therapeutically active substances, for example, with aspirin, phenacetin, thyroid extract, atropine sulfate, aloin, phenobarbital, etc. The preparations are generally compounded with the usual extenders, sweeteners, etc. to form tablets containing the desired dosage. I found that a highly effective, safe and reliable series of preparations may be thus prepared for the treatment of obesity, each tablet containing the indicated amounts of therapeutically active ingredients.

| | Grain |
|---|---|
| A. Monobasic amphetamine phosphate | $\frac{1}{12}$ |
| Thyroid | 1 |
| Atropine | $1/360$ |
| Aloin | $\frac{1}{4}$ |

This preparation should be taken before breakfast.

| | Grain |
|---|---|
| B. Monobasic amphetamine phosphate | $\frac{1}{12}$ |
| Thyroid extract | 1 |
| Atropine | $1/360$ |

This preparation should be taken before lunch.

| | Grain |
|---|---|
| C. Monobasic amphetamine phosphate | $\frac{1}{12}$ |
| Thyroid extract | 1 |
| Phenobarbital | $\frac{1}{4}$ |

This preparation should be taken before dinner.

In the above preparations the thyroid extract serves to stimulate the patient's metabolism, oxidizing and destroying excess fatty tissue. The atropine sulfate appears to enhance the effectiveness of the monobasic amphetamine phosphate in reducing the appetite. The aloin is a laxative that assists in the obesity treatment. Phenobarbital is a well-known sedative, which is advisable in the preparation to be taken before dinner to assist the patient to sleep. It is to be understood, of course, that other well-known auxiliary ingredients serving the above functions may be substituted for use along with my new salt.

A highly effective preparation for the relief of dysmenorrhea and non-organic pain of any type may be prepared in tablet form, each tablet containing the following amounts of therapeutically active ingredients.

Monobasic amphetamine phosphate___mgm__ 3
Aspirin _____grains__ 5
Phenobarbital _____do____ ⅓

This preparation induces a feeling of wellbeing, while its analgesic and sedative contents relieve pain.

The advantages of my new salt, over the known salts of amphetamine, make its use in preparations such as the foregoing, practical and safe. Amphetamine salts are dispensed only by or on the prescription of a physician, and it is obvious that there will be far less hesitancy on the part of the physician in prescribing a salt that can so readily be tolerated by the patient in the dosages required to obtain the desired effects.

I claim:

1. The monobasic phosphate salt of 1-phenyl-2-amino-propane.

2. The racemic form of the salt claimed in claim 1.

3. A therapeutic tablet containing the racemic form of the monobasic phosphate salt of 1-phenyl-2-aminopropane incorporated in an extender.

THEODORE C. GOGGIN.

REFERENCES CITED

The following references are of record in the file of this patent:

UNITED STATES PATENTS

| Number | Name | Date |
| --- | --- | --- |
| 2,356,582 | Haffner et al. | Aug. 22, 1944 |
| 2,361,373 | Alles | Oct. 31, 1944 |

FOREIGN PATENTS

| Number | Country | Date |
| --- | --- | --- |
| 117,996 | Australia | July 10, 1943 |
| 119,265 | Australia | Nov. 21, 1944 |

OTHER REFERENCES

Bakas, "Zentralblatt fur Gynokologie," vol. 34, pages 1893–1898 (1938).

Chinoin, "Klinische Wochenschrift," vol. 13, page 483 (April 1939).

Stepan, "Chemical Abstracts," vol. 37, page 3565 (1943).

Torok, "Chemical Abstracts," vol. 32, page 2211 (1938).

Degering, "An Outline of Organic Nitrogen Compounds," (Univ. Lithoprinters, Ypsilanti, Mich., 1945) page 304. (Available Army Medical Library.) (Available Patent Office Library.)

Hygiea Medicensk Tidskvift, vol. 102, pages 1635–1642 (1940).

Decision of District Ct. N. J. Sept. 1, 1945, 66 USPQ 440, 463, 467, 469.